US011958181B2

(12) United States Patent
Davey

(10) Patent No.: US 11,958,181 B2
(45) Date of Patent: Apr. 16, 2024

(54) JOINERY JIG

(71) Applicant: Scribemaster Limited, Dover (GB)

(72) Inventor: Colin Davey, Dover (GB)

(73) Assignee: Scribemaster Limited, Dover (GB)

( * ) Notice: Subject to any disclaimer, the term of this patent is extended or adjusted under 35 U.S.C. 154(b) by 0 days.

(21) Appl. No.: 17/799,068

(22) PCT Filed: Feb. 12, 2021

(86) PCT No.: PCT/EP2021/053568
§ 371 (c)(1),
(2) Date: Aug. 11, 2022

(87) PCT Pub. No.: WO2021/160871
PCT Pub. Date: Aug. 19, 2021

(65) Prior Publication Data

US 2023/0106740 A1 Apr. 6, 2023

(30) Foreign Application Priority Data

Feb. 13, 2020 (GB) ..................................... 2001952
Jun. 15, 2020 (GB) ..................................... 2009080

(51) Int. Cl.
*B25H 7/02* (2006.01)

(52) U.S. Cl.
CPC ..................................... *B25H 7/02* (2013.01)

(58) Field of Classification Search
CPC ................................... B25H 7/02; B27F 5/12
See application file for complete search history.

(56) References Cited

U.S. PATENT DOCUMENTS 5,285,832 A * 2/1994 Gibson ..................... B27F 1/12 144/144.51
5,318,082 A * 6/1994 Von Hollen .............. B27F 1/12 144/144.1

(Continued)

FOREIGN PATENT DOCUMENTS

GB 2150879 A * 7/1985 ........... B23Q 35/102
GB 2405825 3/2005

(Continued)

OTHER PUBLICATIONS

International Search Report and Written Opinion dated Jun. 3, 2021 and issued in PCT Application No. PCT/EP2021/053568.

*Primary Examiner* — Yaritza Guadalupe-Mccall
(74) *Attorney, Agent, or Firm* — Billion & Armitage

(57) ABSTRACT

A joinery jig comprising a body and a plurality of spacers, wherein the body defines (i) a first straight slot, a second straight slot and an angled slot, wherein the angled slot connects the first straight slot to the second straight slot to define an elongate angled channel; (ii) a plurality of datum alignment elements aligned with the angled slot, wherein each datum alignment element is spaced from a reference point of the angled slot by a pre-determined distance; and (iii) at least one spacer receiving aperture; and wherein the number of spacers is equal to the number of datum alignment elements and each spacer includes a body having a dimension which is equal to the pre-determined distance defined between a respective one of the datum alignment elements and the reference point of the angled slot; and wherein each spacer includes a body portion which fits within the or one of the spacer receiving apertures.

11 Claims, 9 Drawing Sheets

(56) References Cited

U.S. PATENT DOCUMENTS

| | | | | |
|---|---|---|---|---|
| 2002/0100180 | A1* | 8/2002 | Montefusco | B43L 13/205 33/563 |
| 2008/0178486 | A1 | 7/2008 | Pattee | |
| 2015/0276367 | A1* | 10/2015 | Lamanna | G01B 3/566 33/404 |
| 2023/0106740 | A1* | 4/2023 | Davey | B25H 7/02 33/501 |

FOREIGN PATENT DOCUMENTS

| | | | | |
|---|---|---|---|---|
| GB | 2499414 | | 8/2013 | |
| GB | 2499414 | A * | 8/2013 | B23B 47/287 |
| GB | 2525139 | | 10/2015 | |
| GB | 2554714 | | 4/2018 | |
| GB | 2554714 | A * | 4/2018 | B23B 47/287 |
| GB | 2597879 | A * | 2/2022 | B23B 47/287 |

* cited by examiner

JOINERY JIG

FIELD OF THE INVENTION

The present invention relates to joinery jigs and, in particular, to joinery jigs for use in joining kitchen and bathroom counter tops.

BACKGROUND OF THE INVENTION

It is known to provide jigs for cutting worktops and counter tops. Such joins are usually based on what are commonly referred to as "mason mitres".

Most worktops and counter tops have a bevelled edge. Historically, the radius of the bevel has been around 35 mm. As a result of this, known joinery jigs for forming mason mitres have been based around a 35 mm bevel.

More recently, the radius of the bevelled edge of worktops and counter tops has been reduced and such bevelled or angled sections may have a radius of 3 mm, 5 mm, 10 mm, 24 mm, 35 mm or other radius.

This has resulted in the need for updated joinery jigs.

A further problem with existing jigs is the datum points that they use in order to form the mitres. The female mitre cut is typically made by placing the jig at one end of the first workpiece, which corresponds to the rear of the second workpiece. However, when forming the male mitre cut on the second workpiece, the jig is aligned with the front surface. The jig assumes and relies upon a uniform width for the second workpiece. If the width of the second workpiece does not exactly correspond with the "standard" width (say, 600 mm, 700 mm or 900 mm), then using different datum points for the male and female mitres will result in a joint that is inaccurate and will not perfectly align.

Accordingly, there is need for a joinery jig which can accommodate bevelled edges having different radii and which uses a common datum point.

SUMMARY OF THE INVENTION

According to the present invention, there is provided a joinery jig comprising a body and a plurality of spacers, wherein the body defines (i) a first straight slot, a second straight slot and an angled slot, wherein the angled slot connects the first straight slot to the second straight slot to define a continuous elongate angled channel; (ii) a plurality of datum alignment elements aligned with the angled slot, wherein each of the datum alignment elements is spaced from a reference point of the angled slot by a pre-determined distance; and (iii) at least one spacer receiving aperture; and wherein the number of spacers is equal to the number of datum alignment elements and each spacer includes a body having a dimension which is equal to the pre-determined distance defined between a respective one of the datum alignment elements and the reference point of the angled slot; and wherein each spacer includes a body portion which fits within the or one of the spacer receiving apertures.

The skilled person will appreciate that the elongate angled channel defined by the body is intended to function as a guide for a routing tool. Accordingly, it will be further appreciated that the slots, and by extension the elongate angled channel, extend through the body and are thus "through slots".

The datum alignment elements allow the joinery jig to be aligned with a datum reference mark formed on the first work piece, wherein the datum reference mark indicates the front edge of the second work piece. In this way, the front edge of the second work piece is used as the datum point for mitre cut made to the first work piece (e.g. the female mitre cut) and the mitre cut made to the second work piece (e.g. the corresponding male mitre cut).

The datum alignment elements carried by the joinery jig relate to specific radii for the bevelled edges of the work pieces. Accordingly, the user aligns the relevant datum alignment element with the datum reference mark formed on the first work piece to set the first dimension for the jig. One or more of the respective spacers are then located in the relevant spacer receiving apertures to set the second dimension for the jig. With the jig correctly positioned in two-dimensional space, the corresponding cut can then be made in the first work piece.

For the complementary cut in the second work piece, the respective spacers are used to space the jig from the front edge of the second work piece (the common datum reference point) and from the end of the second work piece. With the jig again correctly positioned in two-dimensional space for the second work piece, the corresponding cut can then be made in the second work piece.

For example, if the work pieces have a bevel which has a 5 mm radius, the 5 mm datum alignment element is aligned with the datum reference mark on the first work piece which corresponds to the front edge of the second work piece. Similarly, one or more 5 mm spacers are used to space the jig from the front edge of the first workpiece. This allows a "5 mm mason mitre" to be cut in the first work piece. This is typically the female mitre.

For the second mitre cut, the jig is spaced 5 mm from the front edge of the second work piece by a 5 mm spacer element and is spaced 5 mm from the end of the second work piece by a second 5 mm spacer. This allows a complementary 5 mm mason mitre to be cut in the second work piece, typically the male mitre.

The user can cut mitres for different sized bevels simply by selecting the appropriately sized datum alignment element carried by the joinery jig and the corresponding spacers.

The datum alignment elements may be carried by a window defined within the joinery jig. For example, the alignment elements may comprise indicia formed on one side of the window; pairs of indicia formed on opposing sides of the window; or indicia formed on a transparent insert located within the window. Suitably, the indicia comprise straight lines arranged perpendicular to the longitudinal axis of the first straight slot. The skilled person will appreciate that the term "transparent" as used herein means that the datum reference mark formed on the work piece may be visible through the widow insert element.

Additionally or alternatively, the datum alignment elements may comprise indicia provided at side edge portions of the jig body and/or notches formed in side edge portions of the jig body. Again, the indicia may comprise straight lines arranged to be perpendicular to the longitudinal axis of the first straight slot.

In an embodiment of the invention, the jig comprises a pair of spacers for each datum alignment element, wherein the spacers of each pair of spacers include a body having a dimension which is equal to the pre-determined distance defined between a respective one of the datum alignment elements and the reference point of the angled slot. The use of pairs of spacers together permit the jig to be more accurately aligned with a side edge or end portion of a workpiece.

The skilled person will appreciate that the jig may comprise three or more spacers that correspond to each of the datum alignment elements carried by the joinery jig.

In a further embodiment of the invention, the jig further includes a pivot element that is locatable within the second straight slot and which permits the jig body to rotate about the pivot element. The jig is used as indicated herein for joining work pieces at 90° to each other. However, it is sometimes necessary to join the workpieces at angles other than 90°. In order to do this, the jig may be used to form the first mitre cut in the first work piece (e.g. the female mitre) as described above. However, for the second mitre cut, the jig may be rotated about the pivot element to provide a second mitre which is angled with the respect to the first mitre cut by an angle which is other than 90°.

The pivot element is suitably detachably coupled to the second straight slot. In this way it can be located within the second straight slot when desired and detached from the slot when not required. Furthermore, the pivot element may be releasably locked relative to the body portion which defines the second straight slot. Thus, the pivot element may be located in the desired location within the second straight slot and then locked in the desired position for rotation of the jig about a fixed pivot point.

The jig may include a router guide that is slidably coupled to the elongate angled channel. Alternatively, the elongate angled channel may be sized to receive a standard router guide. In this way, a router tool may be guided by the elongate angled channel to form the desired mitre cut.

The jig body may be a single unitary component. However, such jigs tend to be relatively large and bulky. Accordingly, the jig body may be formed from separate body components that are detachably coupled to each other. Thus, the body may comprise a first body portion, a second body portion and one or more coupling elements, wherein the coupling elements detachably couple the second body portion to the first body portion. In this way, the jig may be assembled for use and dis-assembled for transportation and storage.

In an example of the invention, the first body portion defines the second straight slot, the angled slot and a first portion of the first straight slot; and the second body portion defines a second portion of the first straight slot, wherein the first and second portions of the first straight slot are aligned when the second body portion is coupled to the first body portion.

Alternatively, the jig body may be formed from more than two body components. For example, the body may comprise a first body portion, an upper second body portion, a lower second body portion, a third body portion, a first coupling arrangement comprising two or more first coupling elements, and a second coupling arrangement comprising two or more second coupling elements; wherein the first coupling arrangement detachably couples the upper and lower second body portions to the first body portion, and the second coupling arrangement couples the third body portion to the upper and lower second body portions. The skilled person will appreciate that the second body portion needs to be formed from two separate second body portions if it is to define a second portion of the first straight slot therethrough.

Thus, the first body portion may define the second straight slot, the angled slot and a first portion of the first straight slot; the upper and lower second body portions between them may define a second portion of the first straight slot; and the third body portion may define a third portion of the first straight slot; wherein the first, second and third portions of the first straight slot are aligned when the upper and lower second body portions are coupled to the first body portion, and the third body portion is coupled to the upper and lower second body portions.

A further advantage of the embodiment described above is that the user may couple the third body portion directly to the first body portion (i.e. omit the upper and lower second body portions). In this configuration, a shortened jig may be provided that may be used for smaller counter tops, such as those used in bathrooms, for example.

The skilled person will appreciate that further body portions may be provided between the first and third body portions, wherein the body may be formed from 6 or more body portions.

In a further embodiment of the invention, the jig further includes one or more clamp elements and the body includes one or more clamp recesses, wherein the clamp includes a body portion which is located within a respective one of the clamp recesses such that the body portion is flush with or recessed from an upwardly facing surface of the body. The skilled person will appreciate that a base portion of a router tool or other tool typically contacts and slides across the upwardly facing surface of the jig when cutting the desired mitres. By providing clamp elements and clamp recesses such that a body portion of the clamp element (e.g. an upper body portion of the clamp element) is flush with the upwardly facing surface of the jig body or is recessed below the upwardly facing surface of the jig body, the clamp body portion does not contact or interfere with the router or other tool in use.

The skilled person will appreciate that the features described and defined in connection with the aspect of the invention and the embodiments thereof may be combined in any combination, regardless of whether the specific combination is expressly mentioned herein. Thus, all such combinations are considered to be made available to the skilled person.

BRIEF DESCRIPTION OF THE DRAWINGS

An embodiment of the invention will now be described, by way of example only, with reference to the accompanying drawings in which.

DETAILED DESCRIPTION OF THE INVENTION

For the avoidance of doubt, the skilled person will appreciate that in this specification, the terms “up”, “down”, “front”, “rear”, “upper”, “lower”, “width”, etc. refer to the orientation of the components as found in the example when installed for normal use as shown in the Figures.

Figure 1:
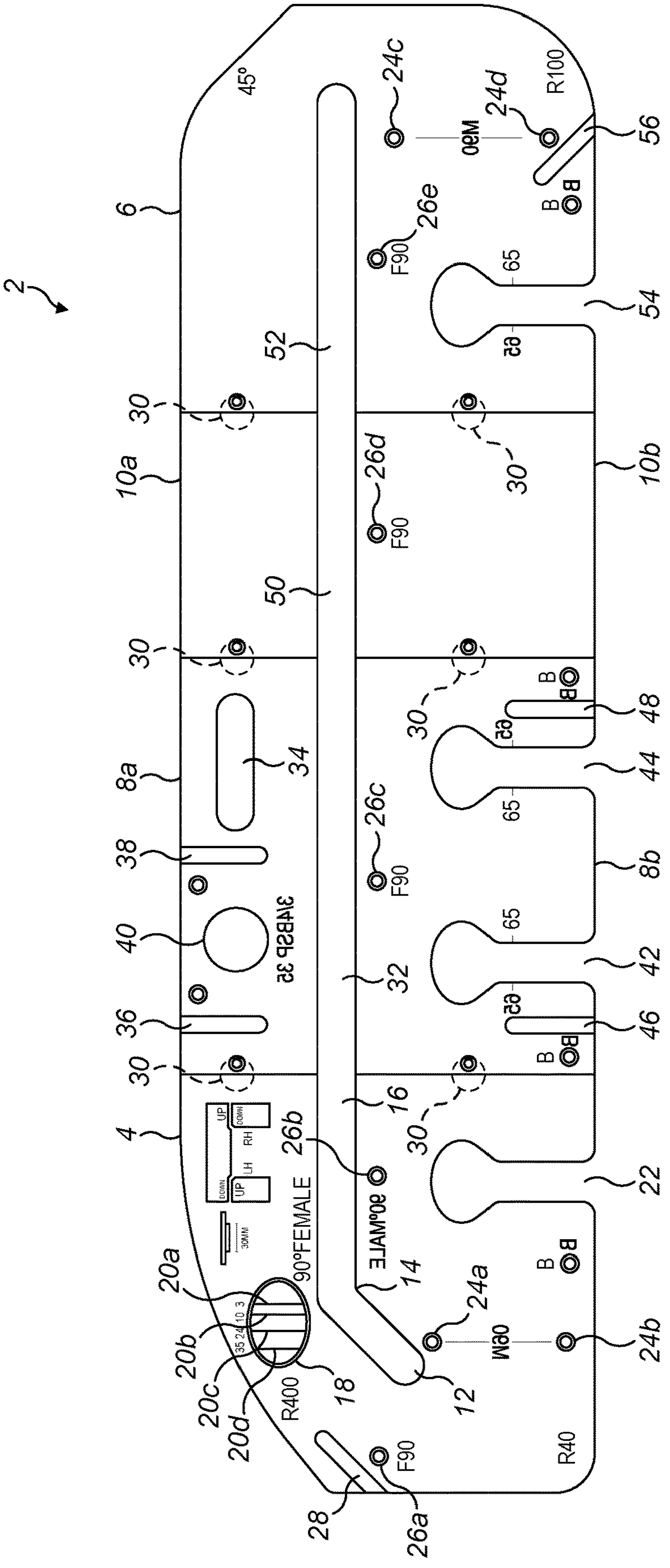
FIG. 1 is a plan view of a joinery jig according to an embodiment of the invention.
Figure 2A:
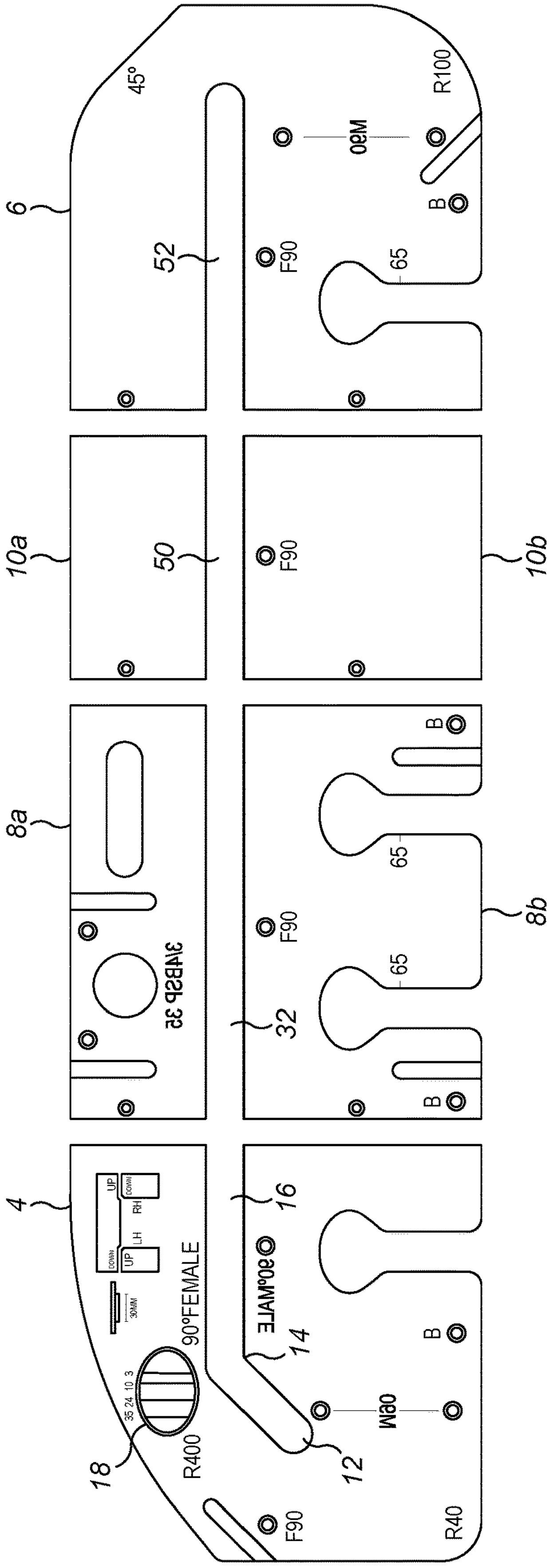
FIG. 2*a* is an exploded view of the jig shown in FIG. 1.

FIGS. 1 and 2*a* show a joinery jig 2 according to an embodiment of the invention. The jig comprises a first end component 4, a second end component 6, a first pair of intermediate components 8*a*, 8*b*, and a second pair of intermediate components 10*a*, 10*b*. Together, the components 4, 6, 8*a*, 8*b*, 10*a*, 10*b* form a planar jig body.

The first end component 4 defines therein a second straight slot 12, an angled slot 14 and a first portion of a first straight slot 16. The slots 12, 14, 16 defined by the first end component 4 are through slots that extend through the jig body.

The first end component 4 also defines a window 18 within which is located a transparent perspex insert. The Perspex insert carries a plurality of indicia 20*a*-20*d* which are in the form of straight lines arranged perpendicular to the longitudinal axis of the jig 2. In other words, perpendicular to the longitudinal axis of the first slot 16. Each of the lines 20*a*-20*d* are spaced a pre-determined distance from a reference point of the angled slot 14.

A standard fixing bolt slot 22 is defined by the first end component 4. The skilled person will appreciate that such slots are commonplace on joinery jigs and are used to cut channels in the underside of work pieces to allow a first work piece to be secured to a second work piece.

A pair of first spacer receiving holes 24*a*, 24*b* are provided along a first axis which is perpendicular to the first slot 16. Additionally, a pair of second spacer receiving holes 26*a*, 26*b* are provided along an axis which is parallel to the longitudinal axis of the first slot 16.

Finally, the first end component 4 defines a recessed clamp slot 28 which is configured to receive therein a clamp element (not shown) which is used to clamp the jig 2 to a work piece.

The first pair of intermediate components 8*a*, 8*b* comprise an upper first intermediate component 8*a* and a lower first intermediate component 8*b*. The upper and lower first intermediate components 8*a*, 8*b* are coupled to the first end component by respective fixing plates 30, which are described in more detail below. The first pair of intermediate components 8*a*, 8*b* define between them a second portion 32 of the first slot 16.

Additionally, the upper first intermediate component 8*a* defines a handle portion 34, two recessed clamp slots 36, 38, and a hinge cutting aperture 40.

The lower first intermediate component 8*b* defines two standard fixing bolt slots 42, 44, and two recessed clamp slots 46, 48. In addition, the lower first intermediate component 8*b* defines a third spacer receiving hole 26*c*.

The second pair of intermediate components 10*a*, 10*b* comprise an upper second intermediate component 10*a* and a lower second intermediate component 10*b*. The upper and lower first intermediate components 10*a*, 10*b* are coupled to the first pair of intermediate components 8*a*, 8*b* by respective fixing plates 30. The first pair of intermediate components 10*a*, 10*b* define between them a third portion 50 of the first slot 16.

The upper second intermediate component 10*a* is a planar sheet. The lower second intermediate component 10*b* defines a fourth spacer receiving hole 26*d*.

The second end component 6 is coupled to the second pair of intermediate components 10*a*, 10*b* by respective fixing plates 30. The second end component 6 defines a fourth portion 52 of the first slot 16, which is closed at one end (the end opposite to the angled slot 14).

The second end component 6 further defines a fifth spacer receiving hole 26*e*, which is aligned with the spacer receiving holes 26*a*-26*d*. The spacer receiving holes 26*a*-26*e* are arranged along an axis which is parallel to the longitudinal axis of the first slot 16. It also defines a pair of first spacer receiving holes 24*c*, 24*d*, which are provided along an axis which is perpendicular to the first slot 16.

Finally, the second end component 6 defines a further recessed clamp slot 56.

FIG. 2*a* shows an exploded view of the joinery jig 2 in a first configuration which includes all of the components 4, 6, 8*a*, 8*b*, 10*a*, 10*b* described above.

Figure 2B:
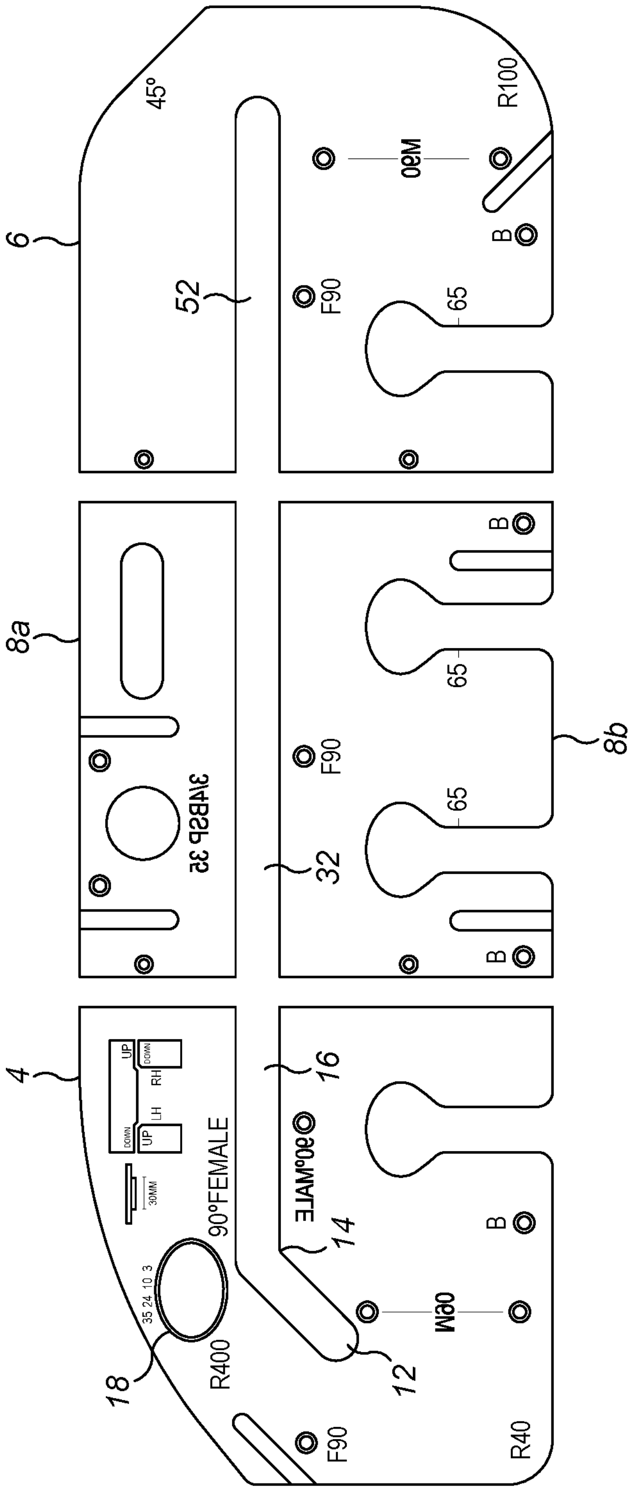
FIG. 2*b* is an exploded view of second configuration of the jig shown in FIG. 1.

FIG. 2*b* shows an alternative configuration in which the second intermediate components 10*a*, 10*b* have been omitted and the second end component 6 has been coupled to the first intermediate components 8*a*, 8*b* via the fixing plates 30.

Figure 2C:
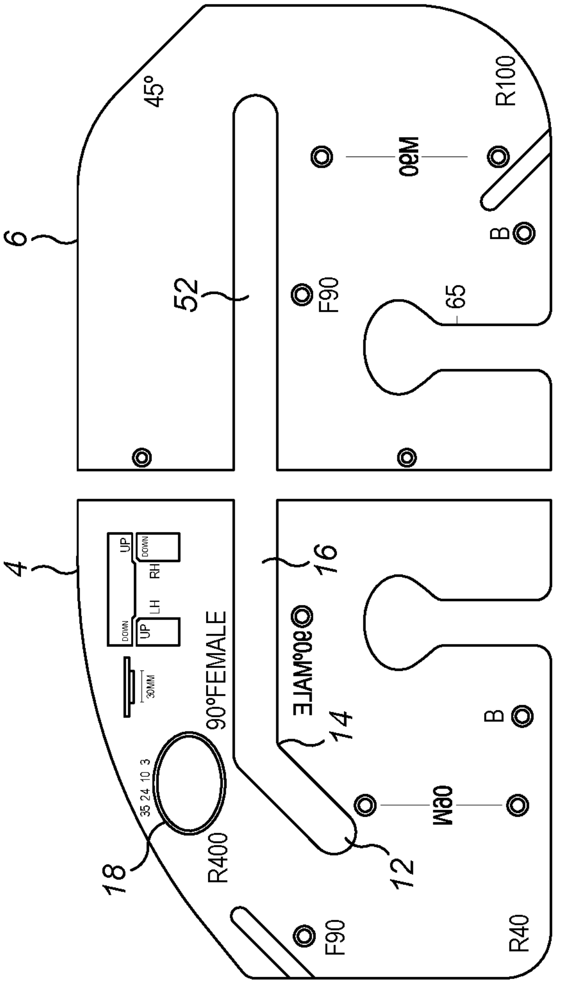
FIG. 2*c* is an exploded view of a third configuration of the jig shown in FIG. 1.

FIG. 2*c* shows a further alternative configuration in which the second end component 6 has been coupled directly to the first end component 4 via the fixing plates 30.

Figure 3:
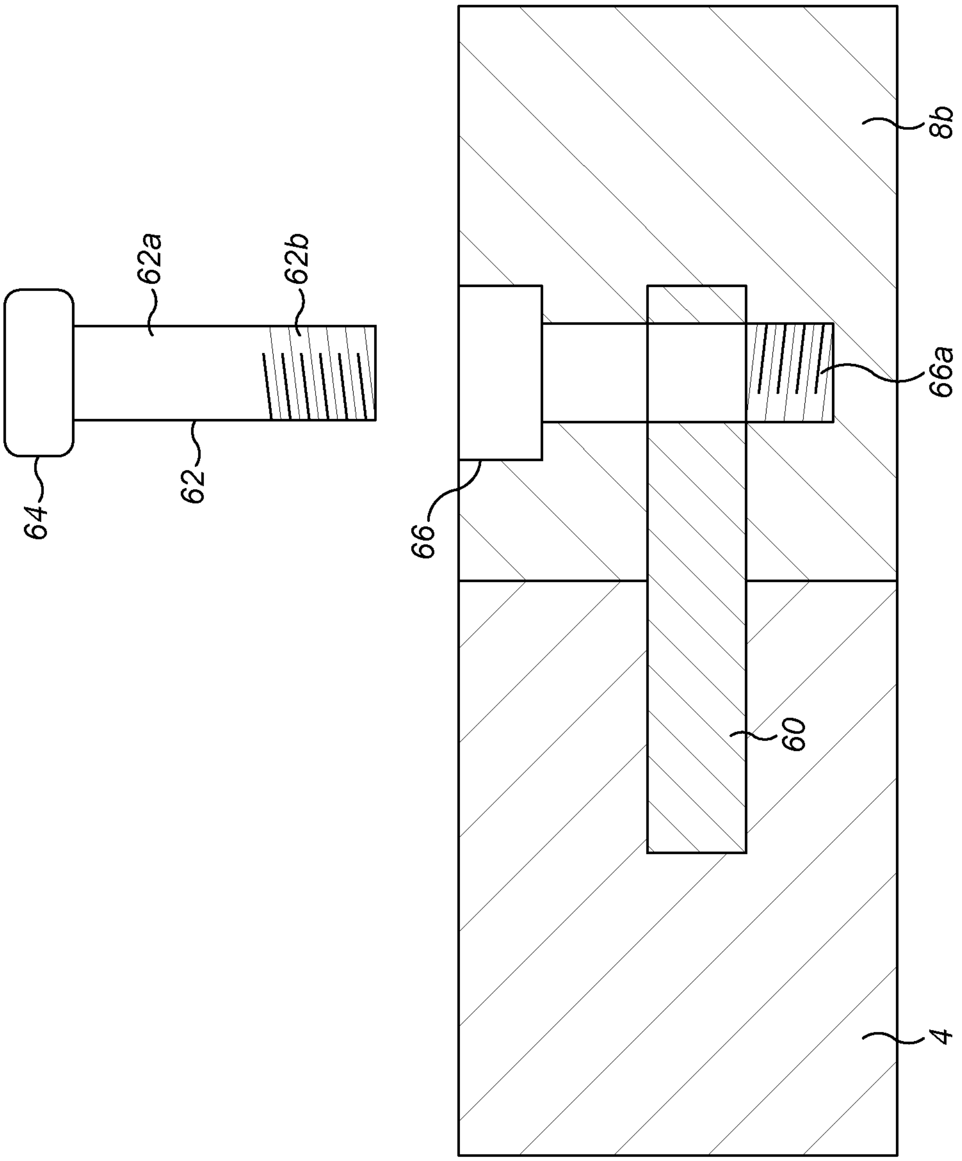
FIG. 3 is a cross-sectional view through a coupling element of the jig.

FIG. 3 shows a cross-sectional view through one of the fixing elements 30. The fixing element 30 comprises a disc-shaped body 60 and a screw fixing 62 comprising a shaft 62*a*, a threaded portion 62*b* and a head 64. The fixing element bodies 60 are fixed on their left hand side (as shown in the figures) to a respective one of the components 4, 6, 8*a*, 8*b*, 10*a*, 10*b* and project from the right hand sides of the respective components. The left hand ends of the components 4, 6, 8*a*, 8*b*, 10*a*, 10*b* define a slot to receive the projecting right hand side portion of the disc body 60 and a recessed screw hole 66 to receive the screw fixing 62. The screw hole includes a threaded portion 66*a* which threadedly receives the screw thread 62*b*. When secured, the head portion 64 of the screw fixing is recessed below the upper surface of the respective component 4, 6, 8*a*, 8*b*, 10*a*, 10*b*.

As the fixing elements 30 project from the right hand side of each component and the left hand side of the components define the disc body receiving slots and screw holes 66, the different configurations shown in FIGS. 2*a*, 2*b* and 2*c* are readily provided.

Figure 4A:
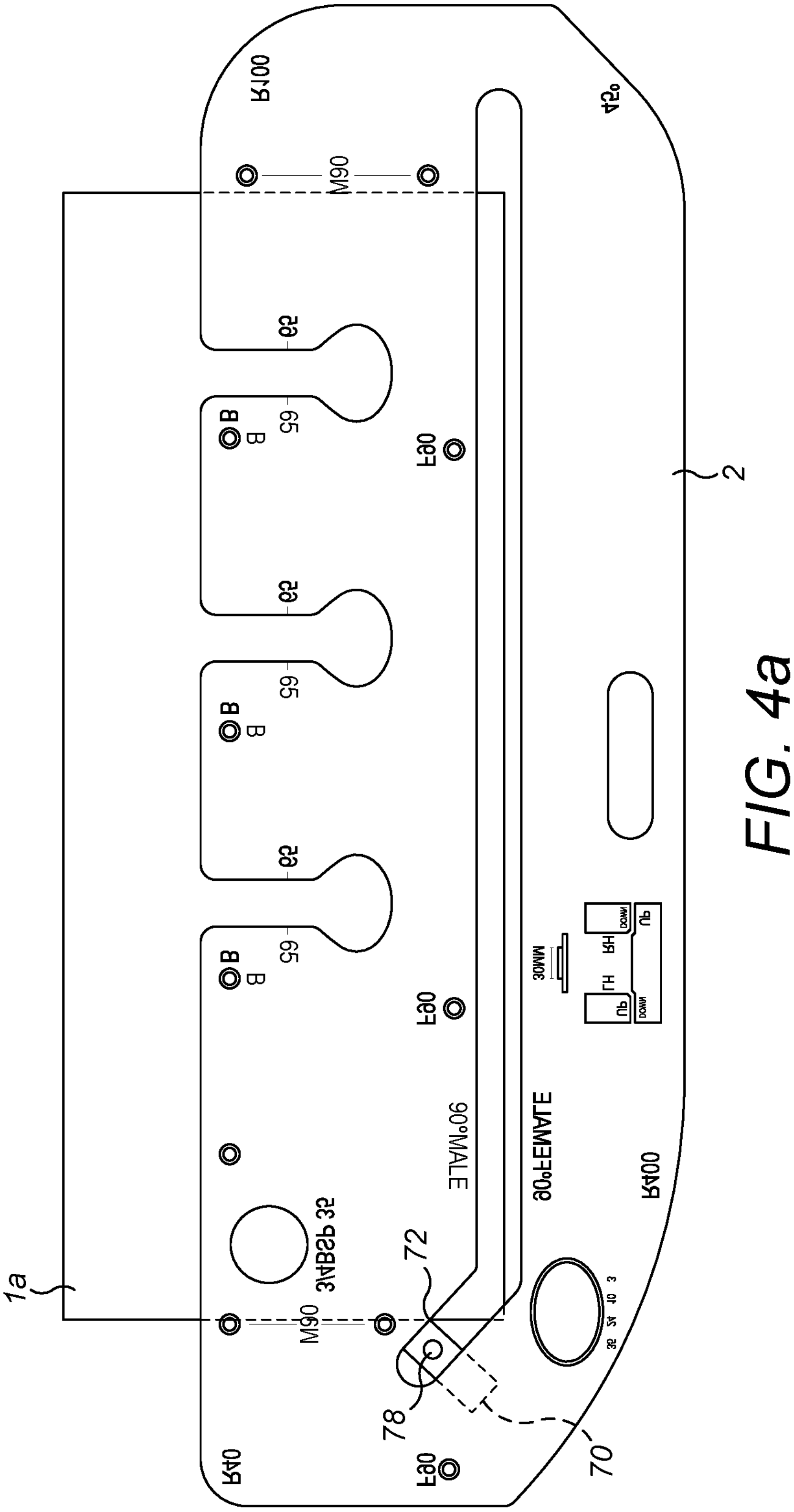
FIG. 4*a* is a plan view of the joinery jig including a pivot block located in the second slot.

FIG. 4*a* shows the joinery jig 2 with a pivot block 70 located within the second slot 12. One corner 72 of the pivot block contacts a work piece 1*a* and acts as a fulcrum about which the jig 2 may be rotated such that the first slot 16 and the second slot 12 are also rotated relative to the work piece 1*a*. This permits two work pieces to be coupled together at angles other than 90°.

Figure 4B:
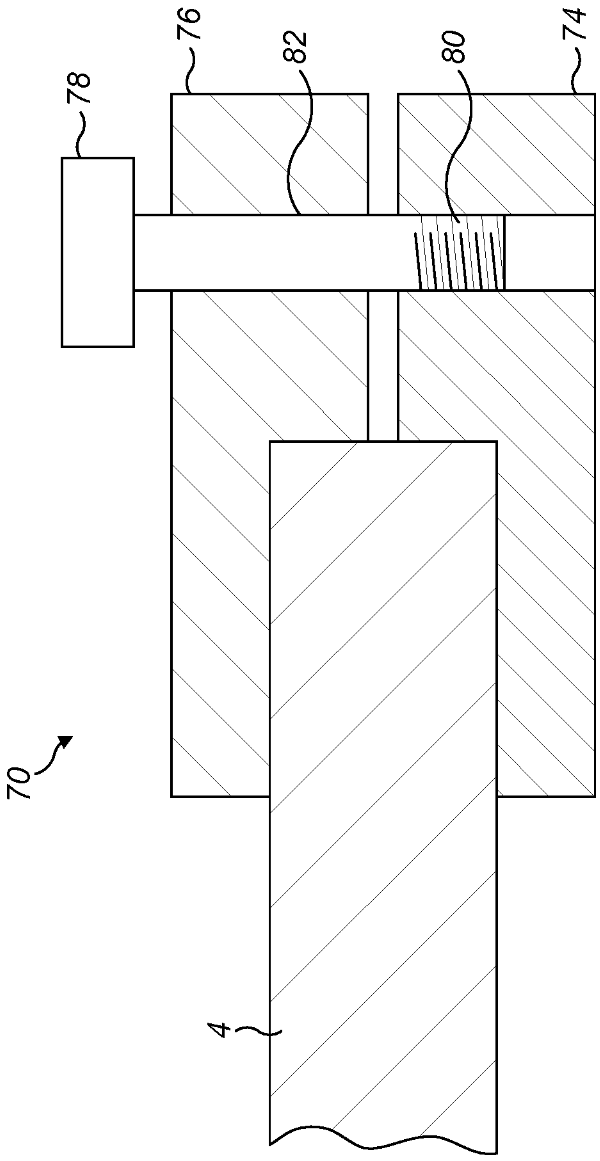
FIG. 4*b* is a cross-sectional view through a pivot block forming part of the joinery jig shown in FIG. 1.

FIG. 4*b* shows the pivot block 70 in more detail. The pivot block 70 comprises a lower block 74, an upper block 76 and a screw fixing 78. The lower block 74 defines a threaded bore 80 which receives a threaded portion of the screw fixing 78 for threaded engagement. The upper block defines a through hole 82 through which the screw fixing 78 passes without engagement.

Both the upper and lower blocks 74, 76 define a recessed channel into which a part of the first end component body 4 may be located, such that the pivot block 70 may be clamped to that part of the first component body 4. Thus, the pivot block 70 may be located in the desired position abutting a work piece and then clamped in that position relative to the first end component 4.

Figure 5A:
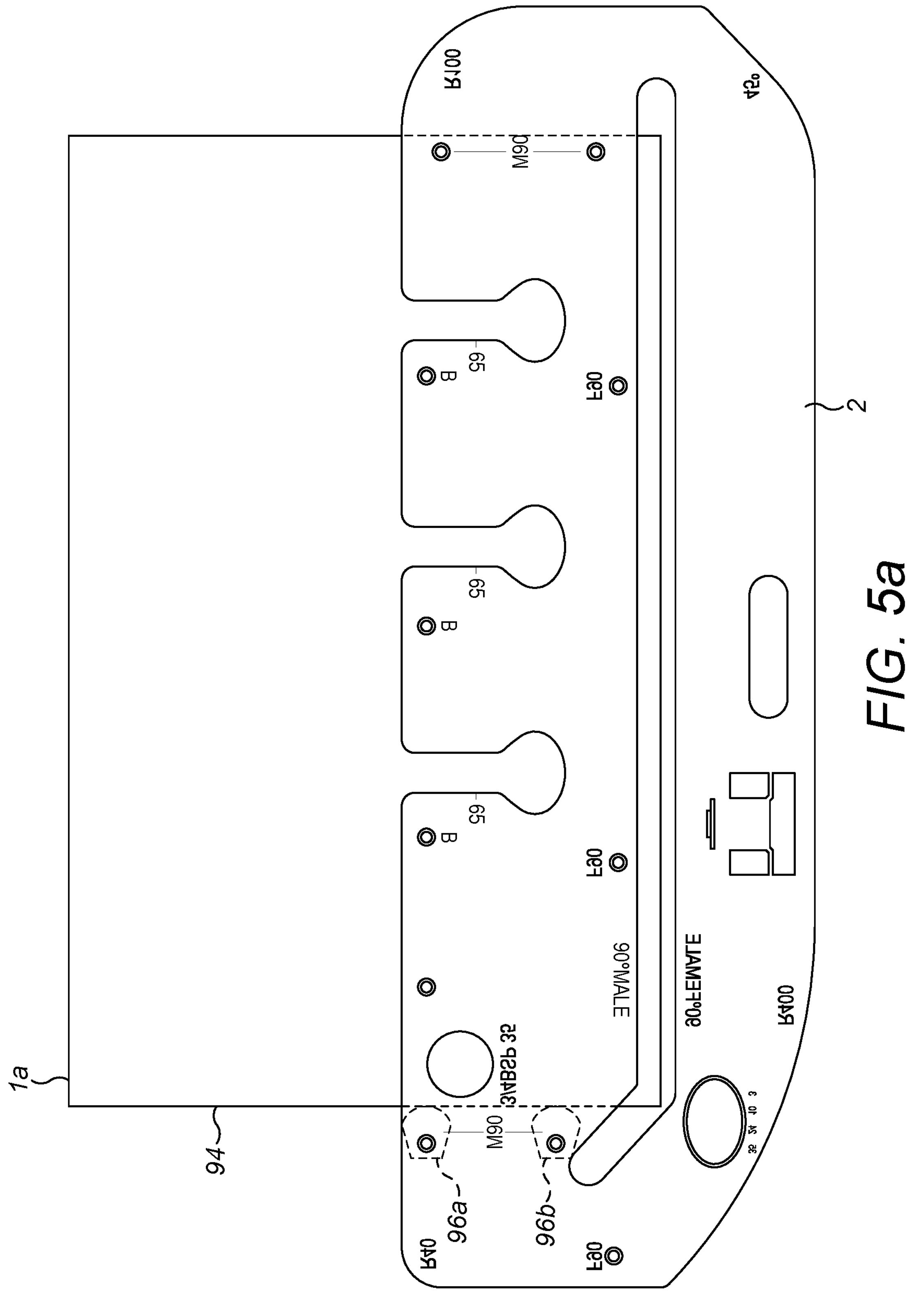
FIG. 5*a* is a view of the joinery jig shown in FIG. 1 arranged for a male mitre cut.
Figure 5B:
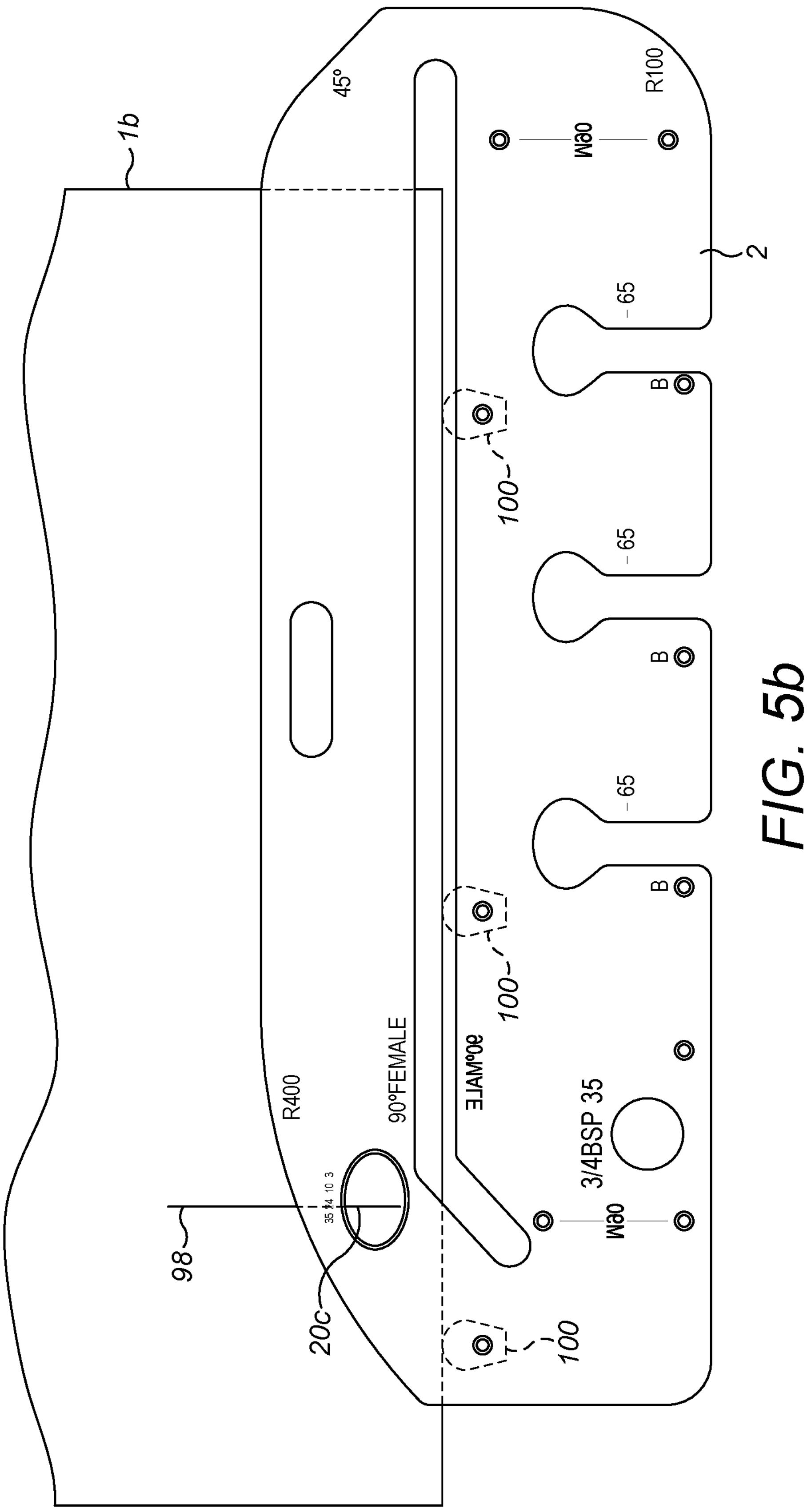
FIG. 5*b* is a view of the joinery jig shown in FIG. 1 arranged for a female mitre cut.

FIGS. 5*a* and 5*b* show the joinery jig 2 located in position on respective work pieces 1*a*, 1*b* to cut the desired mitres.

As shown in FIG. 5*a*, a 24 mm bevel has been selected and the joinery jig 2 is spaced from a datum edge 94 of the work piece 1*a* by a pair of 24 mm spacers 96*a*, 96*b* located in the pair of first spacer receiving holes 24*a*, 24*b* in order to form a male mitre.

FIG. 5*b* shows the arrangement for forming a corresponding 24 mm female mitre on the second work piece 1*b*. In this case, a line 98 corresponding to the datum edge 94 is marked on the second work piece 1*b*. This line 98 is aligned with the 24 mm indicia line 20*c* carried by the window 18. This aligns a first dimension of the jig 2 with the same datum line 94 as for the male cut. The second dimension of the jig 2 is aligned with the work piece 1*b* via three 24 mm spacers 100 located in three of the spacer receiving holes 26*a*-26*e*.

The skilled person appreciates how to use the joinery jig once it has been located in the desired location for forming the desired mitres.

The invention claimed is:

1. A joinery jig comprising a body and a plurality of spacers, wherein the body defines (i) a first straight slot, a second straight slot and an angled slot, wherein the angled slot connects the first straight slot to the second straight slot to define an elongate angled channel; (ii) a plurality of datum alignment elements aligned with the angled slot, wherein each datum alignment element is spaced from a reference point of the angled slot by a pre-determined distance; and (iii) at least one spacer receiving aperture; and wherein the number of spacers is equal to the number of datum alignment elements and each spacer includes a body having a dimension which is equal to the pre-determined distance defined between a respective one of the datum alignment elements and the reference point of the angled slot; wherein each spacer includes a body portion which fits within the or one of the spacer receiving apertures, and wherein the body comprises a first body portion, a second body portion, and one or more coupling elements, wherein the coupling elements detachably couple the second body portion to the first body portion.

2. A joinery jig according to claim 1, wherein the jig comprises a pair of spacers for each datum alignment element, wherein the spacers of each pair of spacers include a body having a dimension which is equal to the pre-determined distance defined between a respective one of the datum alignment elements and the reference point of the angled slot.

3. A joinery jig according to claim 1, wherein the datum alignment elements comprise indicia carried by a window defined by the joinery jig body.

4. A joinery jig according to claim 3, wherein the window includes a transparent window insert and the indicia are formed on the transparent window insert.

5. A joinery jig according to claim 1 wherein the jig further includes a pivot element that is locatable within the second straight slot and which permits the jig body to rotate about the pivot element.

6. A joinery jig according to claim 5, wherein the pivot element may be releasably locked relative to the body portion which defines the second straight slot.

7. A joinery jig according to claim 1, wherein the jig includes a router guide that is slidably coupled to the elongate angled channel.

8. A joinery jig according to claim 1, wherein the first body portion defines the second straight slot, the angled slot and a first portion of the first straight slot; and the second body portion defines a second portion of the first straight slot, wherein the first and second portions of the first straight slot are aligned when the second body portion is coupled to the first body portion.

9. A joinery jig according to claim 1, wherein the body comprises a first body portion, an upper second body portion, a lower second body portion, a third body portion, a first coupling arrangement comprising two or more first coupling elements, and a second coupling arrangement comprising two or more second coupling elements; wherein the first coupling arrangement detachably couples the upper and lower second body portions to the first body portion, and the second coupling arrangement couples the third body portion to the upper and lower second body portions.

10. A joinery jig according to claim 9, wherein the first body portion defines the second straight slot, the angled slot and a first portion of the first straight slot; the upper and lower second body portions between them define a second portion of the first straight slot; and the third body portion defines a third portion of the first straight slot; wherein the first, second and third portions of the first straight slot are aligned when the upper and lower second body portions are coupled to the first body portion, and the third body portion is coupled to the upper and lower second body portions.

11. A joinery jig according to claim 1, wherein the jig further includes one or more clamp elements and the body includes one or more clamp recesses, wherein the clamp includes a body portion which is located within a respective one of the clamp recesses such that the body portion is flush with or recessed from an upwardly facing surface of the body.

* * * * *